July 12, 1938.  C. N. WEBBY  2,123,324
VALVE FOR CONTROLLING HIGH PRESSURES
Filed Oct. 9, 1935
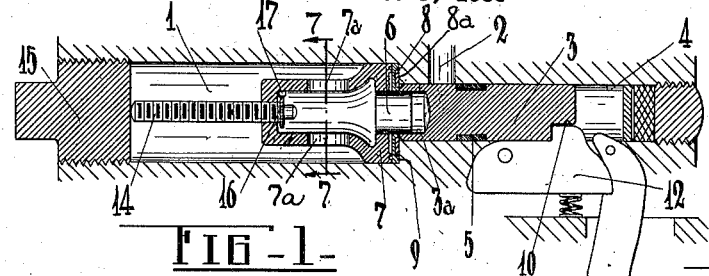
FIG-1-
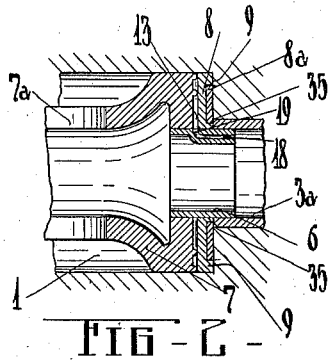
FIG-2-
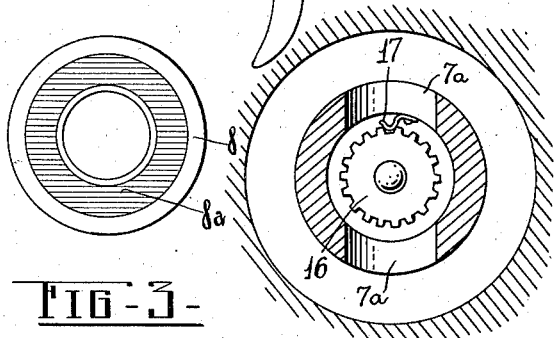
FIG-3-  FIG 7
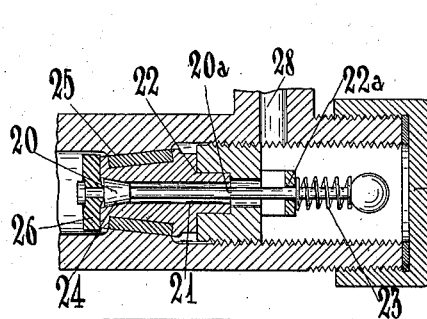
FIG-4-
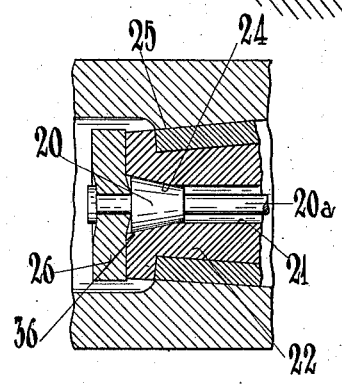
FIG-5-
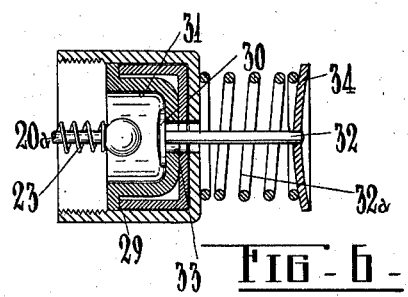
FIG-6-
C. N. Webby
INVENTOR
By: Glascock Downing & Seebold
Attys Patented July 12, 1938

2,123,324

UNITED STATES PATENT OFFICE 2,123,324

VALVE FOR CONTROLLING HIGH PRESSURES

Clive Nelson Webby, Riverlea, Taranaki, New Zealand

Application October 9, 1935, Serial No. 44,298
In New Zealand May 28, 1935

4 Claims. (Cl. 251—27)

The invention relates to valves for controlling fluids at high pressures, and has particular reference to valves used during the generation of high air pressures, the conservation of the latter in reservoirs or storage chambers, and for releasing said pressures, to perform useful work.

The object of the invention is to provide improvements, whereby there is enabled to be provided, simple and efficient valves, which enable fluids, particularly air under pressures exceeding 100 lbs. per square inch to be generated, and more particularly to be retained for use without loss of pressure.

The improvement constituting the main feature of the invention, is applicable to both release and check valves, and also to valves capable of being utilized both as a check valve and as a release valve.

Broadly the invention consists in applying packing under stored pressure as a sealing medium adapted to seal the line of division between a pressure retaining valve, and the surrounding body in and with which the valve makes metal to metal contact in closing a pressure way.

The valve can be of the piston type, or of the poppet type, in the former case opening with and under the pressure, and in the latter case in opposition to said pressure.

In the accompanying drawing in conjunction with which the invention will be more particularly described:—

Figure 1 is a sectional elevation, illustrating the application of the improvements to a piston form of release valve, Figure 2 a part sectional elevation (enlarged) of the packing or washer support shown in Figure 1, Figure 3 an elevation of the packing or washer showing same faced with a protective metal facing, Figure 4 a sectional elevation illustrating the application of the improvements to a check valve, Figure 5 a part sectional elevation (enlarged) showing the application of the packing or washer as used in the form of valve illustrated in Figure 4.

Figure 6 a part sectional elevation showing the valve illustrated in Figure 4 adapted for use also as a release valve.

Figure 7 is an enlarged cross sectional view taken on the line 7—7 of Fig. 1 in the direction in which the arrows are pointing.

In the following, the improvements will be described as applied to valves used in connection with the control of air under pressure, and referring to Figure 1, I represents a reservoir from which it is desired to permit the passage of compressed air to the outlet 2, to perform useful work; the air being compressed and passed to said reservoir 1 by any suitable means.

The release valve 3 is of the piston type, and has a neat working fit in the chamber or bore 4, the outlet 2 through which air is to be discharged, opening from said bore. The valve 3 is fitted with one or a plurality of sealing rings 5, as found necessary or desirable, and has a hollow end 3a adapted to pass over a nipple 6 extending from a support 7 for a packing or washer 8, the latter being held against a shoulder 9 at the junction of the bore 4 in which the piston valve 3 works, and the reservoir 1, the diameter of the latter being greater than the diameter of the bore 4.

The piston valve 3 can be maintained in a position in which it closes the outlet 2, and also so that its hollow end 3a impinges against the packing or washer 8 which surrounds the nipple 6 of the support 7, by any suitable means, such as for instance by a trigger 11 and trigger sear 12, the latter engaging in a recess 10 in said piston valve 3.

The packing or washer support 7 is hollow, and while it fits the reservoir 1 adjacent the shoulder 9, the diameter of the remainder of said support is less than that of the reservoir 1, to permit communication between the latter and the interior of the support 7 through radial ports 7a in the latter.

To prevent displacement of the support 7, and so ensure the packing or washer 8 being retained properly in position between the shoulder 9 and said support 7, the latter has threaded through its end, distant from the nipple 6, a screw 14 adjustable in said end, so that upon the plug 15 or other closure being inserted in or applied to the reservoir 1, the support 7 is forced towards the shoulder 9 between which and said support 7 the packing or washer 8 becomes gripped.

After adjustment, the screw 14 is prevented from slacking "off" by a ratchet wheel 16 thereon being engaged by a spring pawl 17 fitted in said support 7.

Also to ensure effective sealing by said packing or washer 8, of the passageway between the reservoir 1 and the outlet 2, the nipple 6 is formed with a passage 18 which opens through the outer end of the nipple 6, and connects with a further passage 19 opening into a circular recess 13 in the support 7 behind the packing or washer 8, the provision of said passages 18, 19 allowing pressure from the reservoir 1 to pass to, and act behind, the packing or washer 8 and so press same over the circular line of division 35 between the end of the valve 3, and the body metal surrounding the bore 4.

If the trigger 11 be operated to disengage the sear 12 from the recess 10 in the valve 3, the latter is immediately moved along the bore 4 by pressure acting through the nipple 6, to uncover the outlet 2 and so permit pressure to pass from the reservoir 1 through the support 7 and nipple 6 to said outlet 2.

The valve 3 can be returned to the position in which it closes the outlet 2, either by hand, or by suitable spring means which operate following exhaustion of the pressure from the reservoir 1.

In order to prevent mutilation of the packing or washer 8, the latter has on its side presented to the shoulder 9 a protective facing 8a which bridges or covers the circular line of division 35 between the valve 3 and the metal body which surrounds the bore 4, sufficient of the packing or washer 8 being left uncovered, to leave inside and outside the facing 8a, rings of the packing or washer 8 to seal against the end of the valve 3 and the shoulder 9, respectively.

The valve illustrated in Figure 4 is a check or non-return valve, and comprises a poppet 20 on a stem 20a working through an enlarged hole 21 in a valve body 22 screwed into a pressure-way, said stem 20a also working through a guide 22a, and being provided with a light spring 23 which tends to retain the poppet 20 in its seating 24.

The valve body 22 is formed to seat in a seating 25 in the pressureway in which the valve functions, so as to prevent the passage of pressure other than through the hole 21.

The poppet 20 is fitted on its head with a pad 26 of rubber or the like large enough to seal the circular line of division between the poppet 20 and the surrounding seating 24, following complete entry of the poppet 20 into said seating 24.

The pressure-way is closed at the end 27, and has opening thereinto between said end and the valve body 22 a pressure inlet 28, and upon pressure being forced in through the latter, the poppet 20 and pad 26 are both moved from their seatings, and the pressure is passed to a reservoir or to where else desired, back pressure forcing the poppet 20 into its seating 24, and the pad 26 firmly over the circular line of division 36 between said seating 24 and said poppet 20 and effectively sealing the pressure way against loss of pressure through the valve.

In order to convert the valve illustrated in Figure 4 into a valve capable of being used also as a release valve, the cap 29 illustrated in Figure 6, is substituted for the plain cap 27, said cap 29 containing a mushroom headed valve 30, adapted to seat on a rubber seating 31 in the cap 29, under the action of an external spring 32a surrounding the stem 32 between the cap 29 and an enlargement 34.

The stem 32 of the valve 30 passes through an enlarged hole 33 in the cap 29 and the rubber seating 31, so that upon said stem 32 being forced inwards against the action of the spring 32a to contact with the stem 20a, and move the poppet 20 and pad 26 from their seatings, pressure is enabled to escape from the pressureway through the hole 33 in said cap 29.

What I claim and desire to obtain by Letters Patent of the United States of America is:—

1. A valve for controlling high pressures including in combination a reservoir, a reduced chamber extending from said reservoir to form a valve chamber and provided with an outlet, the end of the reservoir adjacent the valve chamber forming a shoulder, a piston valve operating in the valve chamber for regulating passage to the outlet, a packing bearing against the shoulder and acted upon by the pressure to seal the circular line of division between the piston valve and the shoulder.

2. A valve for controlling high pressures including in combination a reservoir, a valve chamber projecting therefrom and provided with an outlet, the point of juncture between the reservoir and the chamber constituting an annular shoulder, a piston valve operating in the chamber for regulating the passage to the outlet, an annular packing arranged against the shoulder, a support in the reservoir provided with a nipple projecting through and engaging in the inner surface of the packing, said support acting to press the packing against the shoulder and the valve being provided with a recess for embracing the nipple and permitting the adjacent end to impinge against the packing, the support being provided with adjustable means to cause the packing to be gripped between it and said shoulder.

3. A valve for controlling high pressure including in combination a reservoir, a valve chamber projecting therefrom and provided with an outlet, the point of juncture between the reservoir and the chamber constituting an annular shoulder, a piston valve operating in the chamber for regulating the passage to the outlet, an annular packing arranged against the shoulder, a support in the reservoir provided with a nipple projecting through and engaging in the inner surface of the packing, said support acting to press the packing against the shoulder and the valve being provided with a recess for embracing the nipple and permitting the adjacent end to impinge against the packing, the support being provided with adjustable means to cause the packing to be gripped between it and the shoulder, and the support adjusting means comprising a screw adjustable in the support, said screw being provided with a toothed wheel adapted to be engaged by a spring pawl in the support.

4. A valve for controlling high pressures, including in combination, a reservoir, a valve chamber extending therefrom and provided with an outlet, said valve chamber merging with the reservoir to form a shoulder, a valve operative in the valve chamber for opening the chamber to the outlet, a packing fixed relative to the shoulder to seal between the shoulder and the valve, said packing having an annular facing member disposed intermediate the inner and outer peripheries of the packing on the side presented to the shoulder, and said facing member being partially engageable with portions of the shoulder and valve.

CLIVE NELSON WEBBY.